US010454579B1

(12) United States Patent
Louderback

(10) Patent No.: US 10,454,579 B1
(45) Date of Patent: Oct. 22, 2019

(54) ACTIVE OPTICAL CABLE FOR HELMET MOUNTED DISPLAYS

(71) Applicant: ZEPHYR PHOTONICS INC., Zephyr Cove, NV (US)

(72) Inventor: Duane Louderback, Zephyr Cove, NV (US)

(73) Assignee: ZEPHYR PHOTONICS INC., Zephyr Cove, NV (US)

( * ) Notice: Subject to any disclaimer, the term of this patent is extended or adjusted under 35 U.S.C. 154(b) by 30 days.

(21) Appl. No.: 15/152,397

(22) Filed: May 11, 2016

(51) Int. Cl.
| | |
|---|---|
| G02B 6/36 | (2006.01) |
| G02B 6/38 | (2006.01) |
| H04B 10/25 | (2013.01) |
| H04B 10/40 | (2013.01) |
| G09G 5/00 | (2006.01) |
| G02B 6/42 | (2006.01) |
| G02B 6/44 | (2006.01) |

(52) U.S. Cl.
CPC ....... *H04B 10/2504* (2013.01); *G02B 6/4278* (2013.01); *G02B 6/4284* (2013.01); *G02B 6/4416* (2013.01); *G09G 5/006* (2013.01); *H04B 10/40* (2013.01); *G02B 6/3825* (2013.01); *G09G 2300/04* (2013.01); *G09G 2370/18* (2013.01)

(58) Field of Classification Search
USPC .......................................... 385/54, 92, 135
See application file for complete search history.

(56) References Cited

U.S. PATENT DOCUMENTS

| | | | | |
|---|---|---|---|---|
| 4,471,174 | A * | 9/1984 | Nava ........................ | A42B 3/30 379/430 |
| 7,046,215 | B1 * | 5/2006 | Bartlett ................... | G01S 5/163 345/8 |
| 7,758,255 | B2 * | 7/2010 | Jones .................... | G02B 6/3825 385/53 |
| 9,277,673 | B2 * | 3/2016 | Droesbeke ........... | G02B 6/4269 |
| 9,445,639 | B1 * | 9/2016 | Aloumanis .......... | A42B 3/0453 |
| 2003/0201911 | A1 | 10/2003 | Kennedy | |

(Continued)

OTHER PUBLICATIONS

GORE® MIL-STD-1760 Assemblies for Military Aircraft (Year: 2019).*

(Continued)

*Primary Examiner* — Eric Wong
(74) *Attorney, Agent, or Firm* — Pillsbury Winthrop Shaw Pittman LLP

(57) ABSTRACT

An active optical cable (AOC) for a helmet mounted display (HMD) includes a transceiver module having a rigid-flex or flex connector packaging to physically couple with an electrical data interface of the HMD. The transceiver module includes one or more media converters to receive electrical data of multiple formats from the helmet mounted display and convert the received electrical data to a common format, and an optical engine communicatively coupled to the one or more media converters to output the converted electrical data as optical data. The AOC includes a cable assembly including at least fiber optic cables with one end of the cable assembly communicatively couple to the transceiver module to receive the optical data output from optical engine; and another transceiver module having a quick-release connector packaging and communicatively coupled to other end of the cable assembly to receive the optical data.

20 Claims, 6 Drawing Sheets

(56) References Cited

U.S. PATENT DOCUMENTS

| | | | |
|---|---|---|---|
| 2006/0048286 A1* | 3/2006 | Donato | A42B 3/042 2/422 |
| 2008/0048931 A1* | 2/2008 | Ben-Ari | A42B 3/0433 345/8 |
| 2008/0136916 A1* | 6/2008 | Wolff | G06F 3/012 348/169 |
| 2011/0052122 A1* | 3/2011 | Brucher | G02B 6/3885 385/54 |
| 2014/0270800 A1 | 9/2014 | Masarik | |
| 2014/0348478 A1* | 11/2014 | Isenhour | G02B 6/4236 385/135 |
| 2016/0125669 A1* | 5/2016 | Meyer | G07C 5/008 701/31.5 |
| 2016/0334591 A1* | 11/2016 | Wood | G02B 6/4246 |
| 2017/0131488 A1* | 5/2017 | Yu | G02B 6/32 |
| 2017/0271797 A1* | 9/2017 | Ito | H01R 12/712 |
| 2017/0315365 A1 | 11/2017 | Shen | |

OTHER PUBLICATIONS

Office Action dated Jul. 31, 2018 in U.S. Appl. No. 15/706,032.
Office Action dated Jan. 23, 2019 in U.S. Appl. No. 15/706,032.
Office Action dated Jul. 18, 2019 in U.S. Appl. No. 15/706,032.

* cited by examiner

ACTIVE OPTICAL CABLE FOR HELMET MOUNTED DISPLAYS

TECHNICAL FIELD

This patent document relates to active optical cables for helmet mounted displays.

BACKGROUND

Helmet mounted displays for military applications are communicatively connected to the aircraft electronics using copper cables. The copper cables are heavy, bulky, and radiate heat. Helmet mounted displays for commercial applications tend to be wireless.

SUMMARY

Disclosed are methods, systems, and devices that provide for active optical cables with connectors customized for a helmet mounted display. The connectors can include a board-mount connector, a flexible connector, or a flex-rigid connector.

In one aspect, an active optical cable (AOC) for a helmet mounted display (HMD) includes a transceiver module having a rigid-flex or flex connector packaging to physically couple with an electrical data interface of the HMD. The transceiver module includes one or more media converters to receive electrical data of multiple formats from the helmet mounted display and convert the received electrical data to a common format, and an optical engine communicatively coupled to the one or more media converters to output the converted electrical data as optical data. The AOC includes a cable assembly including at least fiber optic cables with one end of the cable assembly communicatively couple to the transceiver module to receive the optical data output from optical engine; and another transceiver module having a quick-release connector packaging and communicatively coupled to other end of the cable assembly to receive the optical data.

DETAILED DESCRIPTION

Examples and implementations of the disclosed technology can provide for active optical cables with connectors customized for a helmet mounted display.

Helmet Mounted Display Application

Figure 1:
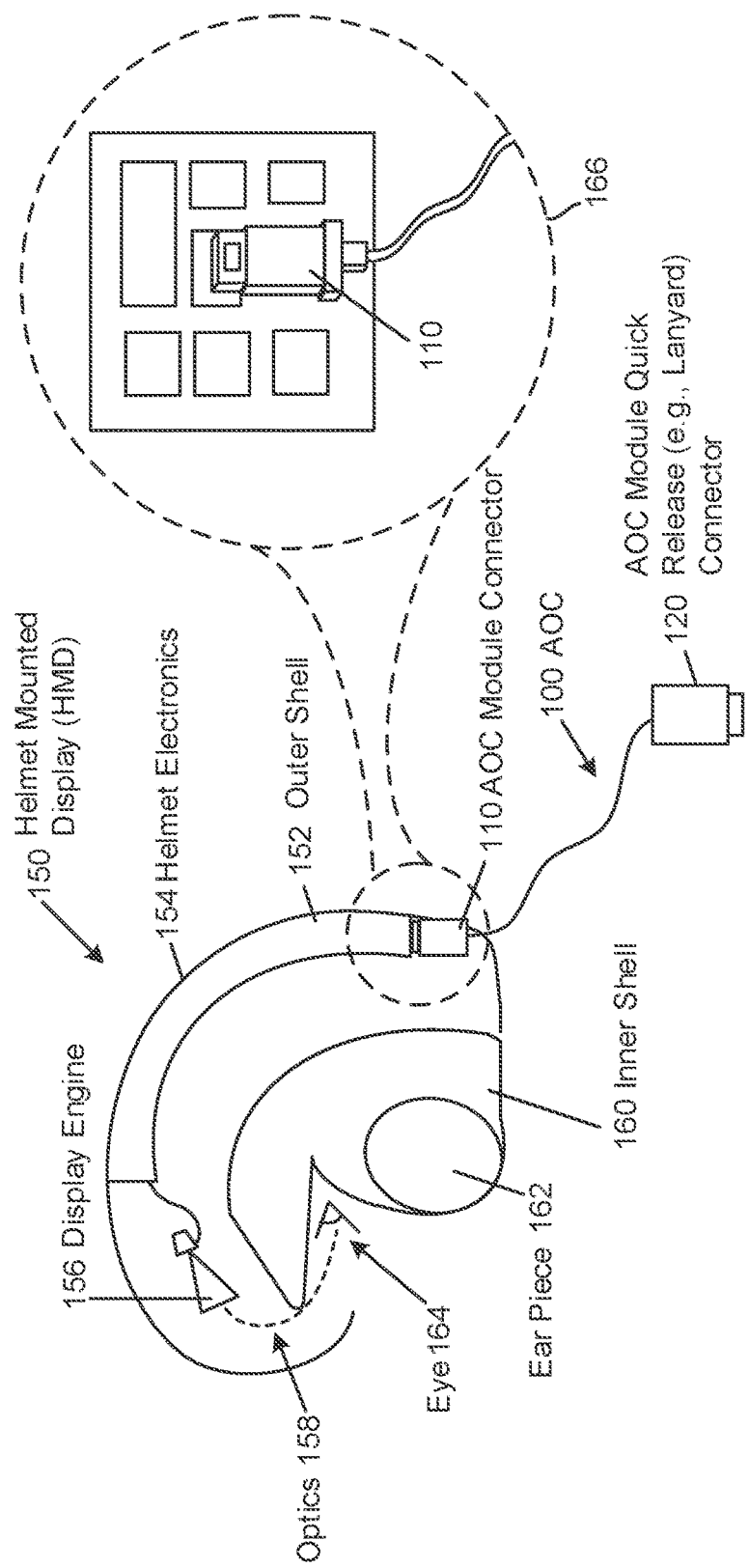
FIG. 1 is an application view showing an exemplary active optical cable connected to a helmet mounted display with a board mount connector.
Figure 2:
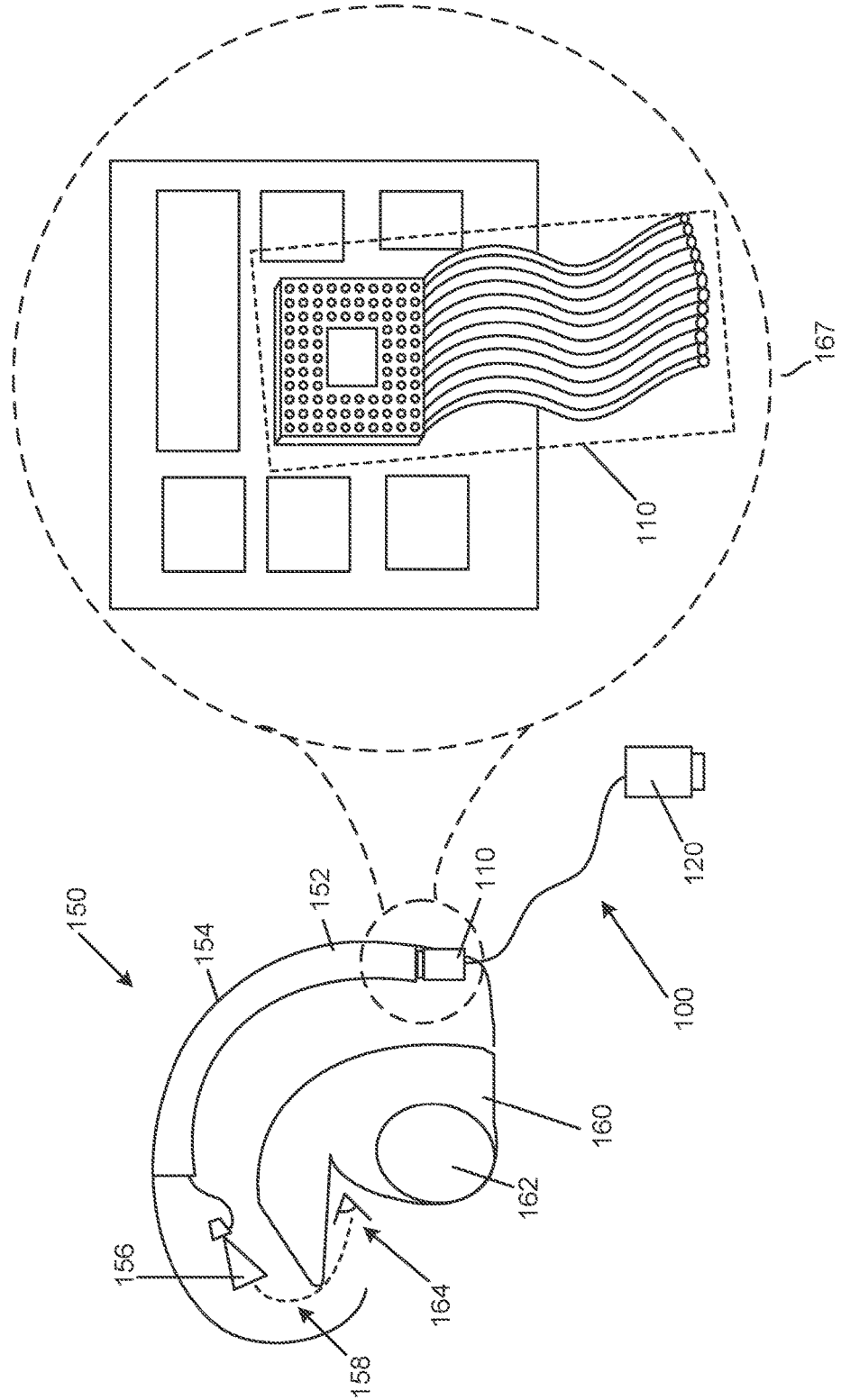
FIG. 2 is a block diagram of an exemplary active optical cable for a helmet mount display.

FIG. 1 is an application view showing an exemplary active optical cable device (AOC) 100 connected to a helmet mounted display with a transceiver module 110 implemented as a board mount connector shown in the inset 166. FIG. 2 is an application view showing an exemplary AOC 100 connected to a helmet mounted display with the transceiver module 110 implemented as a flexible or flex-rigid connector shown in the inset 167. The AOC device 100 includes a cable assembly 130 connected between two transceiver modules 110 and 120. The cable assembly 130 includes fiber optic cables and in some implementations both fiber optic cables and electrical cables. The cable assembly 130 can transmit both optical data and electrical power between the two transceiver modules 110 and 120. The transceiver modules 110 and 120 can perform data conversion between electrical data and optical data. The transceiver modules can also transmit electrical power between each other through the cable assembly 130.

The AOC device 100 is structurally customized for communicatively connecting with the electrical data interface in a helmet mounted display (HMD) 150. Specifically, each of the connector packaging structure for the transceiver modules 110 and 120 are customized for each specific physical connection desired. For example, the transceiver module 110 that communicatively connects with the electrical interface in the HMD 150 is designed to replace a copper wire connection. The inset 166 of FIG. 1 shows an exemplary location where the transceiver module 110 connects with the electrical interface of the HMD 150. The inset 166 shows a board-mount connector implementation of the transceiver module 110. Structurally, the board-mount connector of the transceiver module 110 can be implemented using a variety of connector packaging, including a flex-connector, a flex-rigid, or a rigid-flex connector. FIG. 2 shows an example of an exemplary flex, flex-rigid, or rigid-flex connector packaging for the transceiver module 110 that communicatively connects with the electrical interface in the HMD 150.

The HMD 150 can include a soft inner shell 160 that contacts the head of a user and a hard outer shell 152 disposed over the inner shell to protect the head of the user from external environment. In addition, various electronics and data collection modules are disposed between the inner shell 160 and the outer shell 152 or attached to an external surface of the outer shell 152. The various electronics, data output, and data collection modules of the HMD 150 can include an ear piece 162 to provide audio data to the user; optics 158 (e.g., a camera, a display, or both) for displaying images and videos to the user, collecting image data from the eye of the user, or both; display engine 156 for processing the image and video data displayed and collected; and helmet electronics 154 for transmitting and receiving various electrical data to and from the various electronics, data output, and data collection modules of the HMD 150. The data collected from the data collection modules of the HMD 150 are transmitted through the AOC device 100 via the transceiver module 110 that interfaces with the helmet electronics 154. Also, data provided to the user through the data output device on the HMD 150 is received through the AOC device 100 via the transceiver module 110.

The transceiver module 120 at the other end of the AOC device 100 that interfaces with aircraft electronics can be implemented using a quick-release connector packaging. The quick-release connector packaging allows the HMD 150 to detach from the aircraft in case of an emergency where the user wearing the HMD 150 needs to eject from the aircraft. Examples of the quick-release connector packaging includes a lanyard connector form-factor. In some implementations, the transceiver module 110 that interfaces with the HMD 150 can also be implemented using a quick-release connector packaging.

The AOC device 100 is advantageous compared to copper wire cables for a number of reasons. For example, the AOC device 100 is lighter and less bulky than the copper wire cables. Also, the AOC device 100 does not suffer from heat generation and thus does not need heavy insulations as the copper wire cables. In addition to the advantageous physical structure, the fiber optic cables in the AOC device 100 are more efficient than copper wires at reducing data loss, enhancing communication speed, and enhancing signal-to-noise ratio. Moreover, the AOC device 100 can support multiple data types and protocols.

Figure 3:
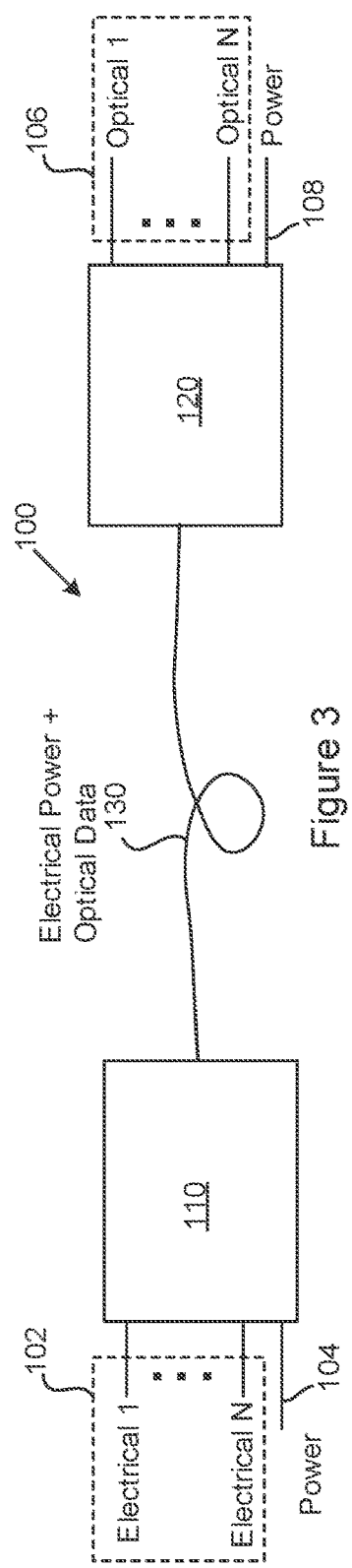
FIG. 3 is an application view showing an exemplary active optical cable connected to a helmet mounted display with a flexible or flex-rigid connector.

FIG. 3 is a block diagram showing a high-level layout of the exemplary active optical cable device 100 for a helmet mount display application. The transceiver module 110 that interfaces with the electrical data interface of the HMD 150 can receive a number of electrical data 102 (e.g., Electrical 1, . . . Electrical N). The electrical data 102 is first converted into optical data by transceiver module 110. The optical data is carried to the other transceiver module 120 via the cable assembly 130. The transceiver module 120 receives the optical data and converts back the optical data into electrical data. The transceiver module 120 outputs electrical data (e.g., Electrical 1, . . . , Electrical N). The transceiver module 110 that interfaces with the electrical data interface of the HMD 150 can also receive electrical power 104 can transmit the electrical power via the cable assembly 130 to the other transceiver module 120 at the other end of the AOC device 100. Thus, in an embodiment, the cable assembly 130 can carry optical data and electrical power between the transceiver modules 110 and 120.

Transceiver Modules

FIGS. 4 through 7 are block diagrams showing various exemplary connectors of an active optical cable for a helmet mounted display. As shown in FIGS. 4 through 7, a number of different data types can be received as the electrical data 102, 502, 602, and 702. For example, a number of control data (e.g., serial 1, . . . serial N) and a number of video data (e.g., video 1, . . . video N) can be received from the HMD 150 as the electrical data at the transceiver module 110, 510, 610, and 710. FIGS. 4 through 7 illustrate different exemplary components of the transceiver modules 110, 510, 610, 710 that processes the received electrical data 102, 502, 602, and 702 including data conversion between different formats, protocols, etc.

Figure 4:
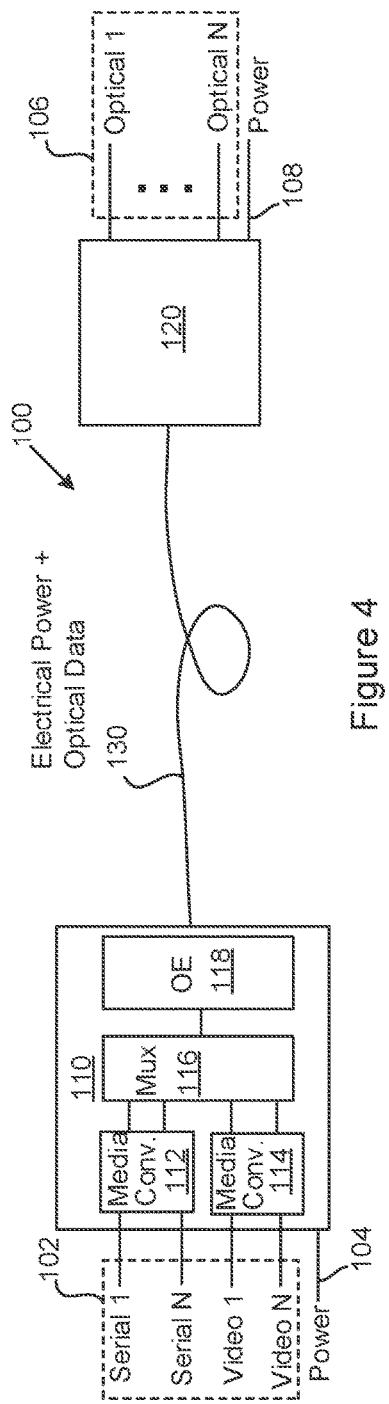
FIGS. 4-7 are block diagrams showing various exemplary connectors of an active optical cable for a helmet mounted display.

For example, FIG. 4 shows the exemplary transceiver module 110 of the exemplary AOC device 100 with media converters 112, 114, a multiplexer 116, and an optical engine 118. The transceiver module 110 that interfaces with the electrical interface of the HMD 150 can include media converters 112 and 114 for converting electrical serial data and video data respectively to a common format, for example. The media converters 112 and 114 can process multiple control serial data and video data, for example. The media converters 112 and 114 can be implemented to be substantially similar to media converter 850 in FIG. 8 below. See description of the media converter 850 with respect to FIG. 8 below.

The output of the media converters 112 and 114 are processed by a multiplexer 116 to selectively forward the outputs of the media converters 112 and 114 into the optical engine 118 for converting into optical data. The optical engine 118 can be implemented to be substantially similar to the optical engine 890 descried with respect to FIG. 8 below. The cable assembly 130 carries the optical data to the other transceiver module 120 at the other end of the AOC 100 that interfaces with the aircraft electronics using a quick-release connector packaging. The transceiver module 120 converts back the optical data carried by the cable assembly 130 into electrical data 106 (e.g., Electrical 1, . . . , Electrical N).

In addition, in an embodiment, the transceiver module 110 forwards the electrical power 104 to the other transceiver module 120 via the cable assembly 130 and is output as electrical power 108.

In some implementations, the other transceiver module 120 at the other end of the AOC device 100 can be implemented to be substantially similar to the transceiver module 110.

Figure 5:
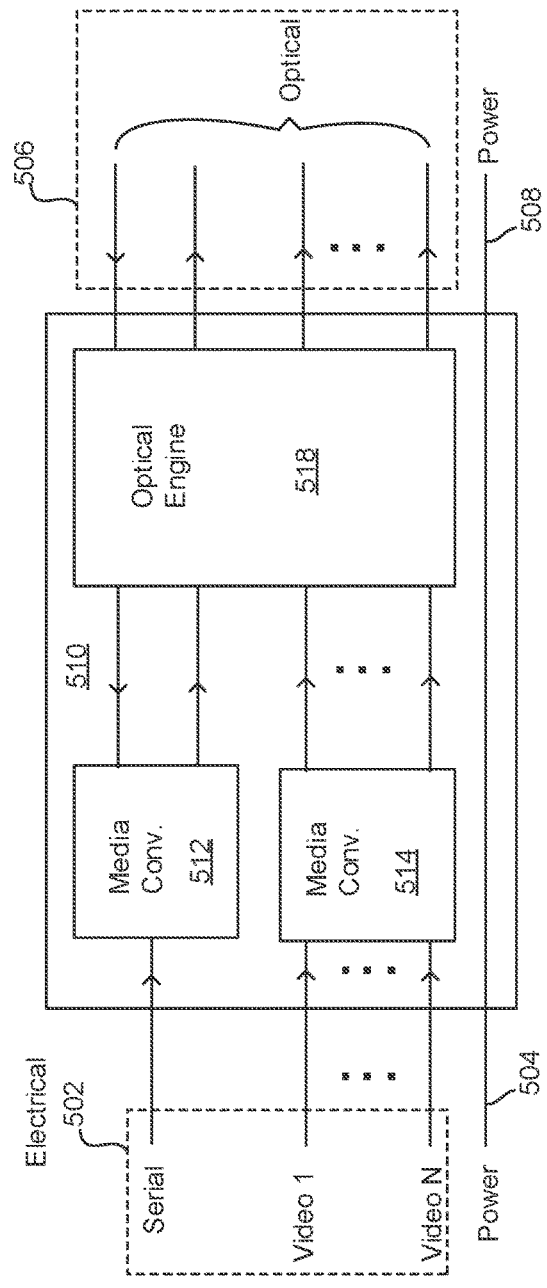

FIG. 5 shows another exemplary transceiver module 510 for communicatively connecting with the electrical data interface of the HMD 150. In the exemplar shown in FIG. 5, the transceiver 510 includes media converters 512 and 514 that processes electrical data 502, similar to the media converters 112 and 114 of FIG. 4. However, the media converters 512 and 514 are directly coupled to the optical engine 518 without a multiplexer. Thus, the optical engine 518 in FIG. 5 is able to process multiple data in parallel to output the optical data 506. Also, the transceiver 510 can receiver electrical power 504 and forward it as electrical power 508 to the other transceiver module (not shown) at the other end of the AOC.

Figure 6:
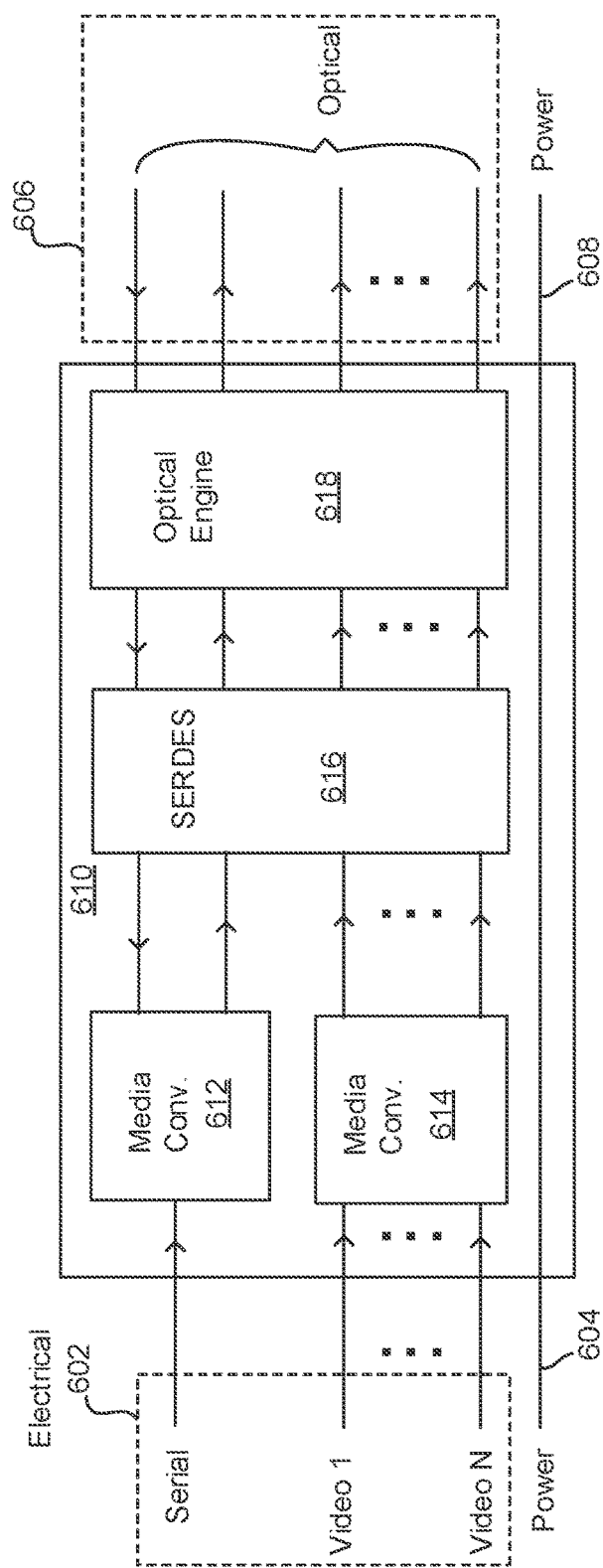

FIG. 6 shows another exemplary transceiver module 610 for communicatively connecting with the electrical data interface of the HMD 150. In the exemplar shown in FIG. 6, the transceiver 610 includes media converters 612 and 614 that processes electrical data 602, similar to the media converters 112 and 114 of FIG. 4. However, the media converters 612 and 614 are communicatively coupled to a SERDES circuit 616. The SERDES 616 can be implemented to be substantially similar to SERDES 855 described with respect to FIG. 8 below. For example, the output of the media converters 612 and 614 can be multiplexed or demultiplexed using the SERDES 616 into one or more higher speed serial data streams to reduce the number of optical channels. The decision to include the SERDES 616 (multiplexing and/or demultiplexing) can be a design decision based on the unique requirements of the active optical cable. Such moderately high data rate inputs may all be converted to a common interface thereby allowing different interface blocks to be interchanged with minimal change to the overall board design. The output of the SERDES circuit 616 is coupled to an optical engine 618 to convert to optical data. Thus, the optical engine 618 in FIG. 6 is able to process multiple data in parallel to output the optical data 606. Also, the transceiver 610 can receive electrical power 604 and forward it as electrical power 608 to the other transceiver module (not shown) at the other end of the AOC. The data communication between the media converter 612 and the SERDES 616 is bidirectional. Similarly, the data communication between the SERDES 616 and the optical engine 618 is bidirectional.

Figure 7:
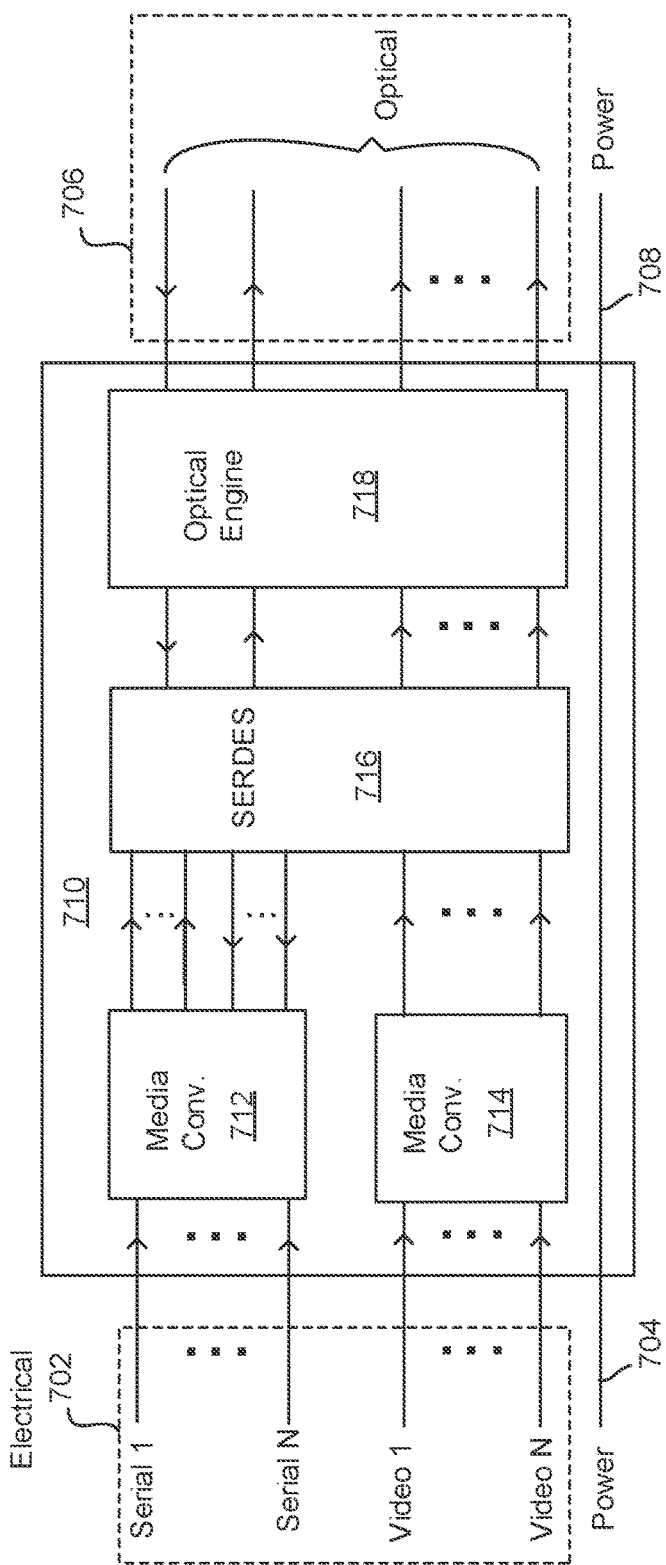

FIG. 7 shows another exemplary transceiver module 710 for communicatively connecting with the electrical data interface of the HMD 150. The transceiver module 710 is substantially similar to the transceiver module 610 except that the transceiver module 710 is illustrated to process multiple control serial data (serial 1, . . . serial N). Consequently, multiple bidirectional data communication paths are shown between a media converter 712 and a SERDES 716. In the exemplar shown in FIG. 7, the transceiver 710 includes media converters 712 and 714 that processes electrical data 702, similar to the media converters 612 and 614 of FIG. 6. The media converters 712 and 714 are communicatively coupled to a SERDES circuit 716 and can process multiple serial data. The SERDES 716 can be implemented to be substantially similar to SERDES 855 described with respect to FIG. 8 below. For example, the output of the media converters 712 and 714 can be multiplexed or demultiplexed using the SERDES 716 into one or more higher speed serial data streams to reduce the number of optical channels. The decision to include the SERDES 716 (multiplexing and/or demultiplexing) can be a design decision based on the unique requirements of the active optical cable. Such moderately high data rate inputs may all be converted to a common interface thereby allowing different interface blocks to be interchanged with minimal change to the overall board design. The output of the SERDES circuit 716 is coupled to an optical engine 718 to convert to optical data. Thus, the optical engine 718 in FIG. 7 is able to process multiple data in parallel to output the optical data 706. Also, the transceiver 710 can receiver electrical power 704 and forward it as electrical power 708 to the other transceiver module (not shown) at the other end of the AOC. The data communication between the media converter 712 and the SERDES 716 is bidirectional. Similarly, the data communication between the SERDES 716 and the optical engine 718 is bidirectional.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. An active optical cable for a helmet mounted display, the active optical cable comprising:
    a first transceiver module having a rigid-flex or flex connector packaging configured to physically couple with an electrical data interface of the helmet mounted display, wherein the first transceiver module includes:
        one or more media converters configured to receive electrical data of multiple formats from the helmet mounted display and convert the received electrical data to a common format, and
        an optical engine communicatively coupled to the one or more media converters of the first transceiver module to output the converted electrical data as optical data;
    a cable assembly including at least fiber optic cables with a first end of the cable assembly communicatively coupled to the first transceiver module to receive the optical data output from the optical engine of the first transceiver module; and
    a second transceiver module that interfaces with aircraft electronics implemented using a quick-release connector packaging for detachment from the aircraft electronics, the quick-release connector packaging comprising a lanyard connector, wherein the quick-release connector packaging is communicatively coupled to a second end of the cable assembly to receive the optical data and that allows detachment of the helmet mounted display, the second transceiver module being configured to convert the received optical data into electrical data.

2. The active optical cable of claim 1, wherein the first transceiver module is further configured to receive an electrical power signal and forward the received electrical power signal to the second transceiver module in addition to the optical data, and wherein the first transceiver module is implemented using an additional quick-release connector packaging.

3. The active optical cable of claim 1, wherein the first transceiver module includes a multiplexer disposed between the one or more media converters and the optical engine.

4. The active optical cable of claim 1, wherein the first transceiver module includes a serializer/deserializer (SERDES) disposed between the one or more media converters and the optical engine.

5. The active optical cable of claim 1, wherein the one or more media converters of the first transceiver module includes a first media converter coupled to receive serial data and a second media converter coupled to receive video data.

6. The active optical cable of claim 5, wherein:
    the first media converter of the first transceiver module is configured to receive multiple serial data, and
    the second media converter of the first transceiver module is configured to receive multiple video data.

7. The active optical cable of claim 1, wherein the rigid-flex or flex connector packaging of the first transceiver module includes a board mounted connector.

8. A transceiver module of an active optical cable configured to physically couple to a helmet mounted display, the transceiver module of the active optical cable comprising:
    a rigid-flex or flex connector packaging configured to physically couple with an electrical data interface of the helmet mounted display;
    one or more media converters configured to receive electrical data of multiple formats from the helmet mounted display and convert the received electrical data to a common format;
    an optical engine communicatively coupled to the one or more media converters to output the converted electrical data as optical data; and
    a quick-release connector packaging comprising a lanyard connector communicatively coupled a cable assembly to receive the optical data,
    wherein the transceiver module is configured to receive an electrical power signal and forward the received electrical power signal external to the transceiver module,
    wherein the transceiver module interfaces with aircraft electronics and is implemented using the quick-release connector packaging for detachment from the aircraft electronics to allow for detachment from the helmet mounted display, and
    wherein the transceiver module is configured to receive an electrical power signal from the helmet mounted display and forward the received electrical power signal and the optical data to an additional transceiver module located at an opposite end of the active optical cable.

9. The transceiver module of claim 8, further comprising:
a multiplexer disposed between the one or more media converters and the optical engine.

10. The transceiver module of claim 8, further comprising:
a serializer/deserializer (SERDES) disposed between the one or more media converters and the optical engine.

11. The transceiver module of claim 8, wherein the one or more media converters include a first media converter coupled to receive serial data and a second media converter coupled to receive video data.

12. The transceiver module of claim 11, wherein:
the first media converter is configured to receive multiple serial data; and
the second media converter is configured to receive multiple video data.

13. The transceiver module of claim 8, wherein the rigid-flex or flex connector packaging of the transceiver module includes a board mounted connector.

14. A helmet mounted display system, comprising:
a helmet mounted display; and
an active optical cable physically coupled to the helmet mounted display at a first end and aircraft electronics at a second end, the active optical cable including:
a first transceiver module having a rigid-flex or flex connector packaging configured to physically couple with an electrical data interface of the helmet mounted display, the first transceiver module being implemented using a first quick-release connector packaging, and wherein the transceiver module includes:
one or more media converters configured to receive electrical data of multiple formats from the helmet mounted display and convert the received electrical data to a common format, and
an optical engine communicatively coupled to the one or more media converters of the first transceiver module to output the converted electrical data as optical data;
a cable assembly including at least fiber optic cables with the first end of the cable assembly communicatively coupled to the first transceiver module having to receive the optical data output from the optical engine of the first transceiver module; and
a second transceiver module that interfaces with the aircraft electronics implemented using a second quick-release connector packaging for detachment from the aircraft electronics, the second quick-release connector packaging comprising a lanyard connector, wherein the quick-release connector packaging is communicatively coupled to the second end of the cable assembly to receive the optical data and that allows detachment of the helmet mounted display, the second transceiver module being configured to convert the received optical data into electrical data.

15. The helmet mounted display system of claim 14, wherein the first transceiver module is further configured to receive electrical power signal and forward the received electrical power signal to the second transceiver module.

16. The active optical cable of claim 4, wherein the multiplexer is further configured to:
multiplex and/or demultiplex the converted electrical data from the one or more media converters using the serializer/deserializer (SERDES) into one or more higher speed serial data streams based on one or more requirements of the active optical cable.

17. The transceiver module of claim 8, wherein:
the additional transceiver module interfaces with aircraft electronics;
the quick-release connector packaging of the transceiver module is for detachment from the aircraft electronics; and
the electrical power signal and the optical data are forwarded via the additional transceiver module to the aircraft electronics.

18. The helmet mounted display system of claim 14, wherein:
the first transceiver module is configured to receive an electrical power signal from the helmet mounted display and forward the received electrical power signal and the received optical data to aircraft electronics via the second transceiver module at the second end of the active optical cable.

19. The helmet mounted display system of claim 14, wherein the first transceiver module includes:
a multiplexer disposed between the one or more media converters and the optical engine; and
a serializer/deserializer (SERDES) disposed between the one or more media converters and the optical engine, wherein:
data communication between the one or more media converters and the serializer/deserializer (SERDES) is bidirectional, and
data communication between the serializer/deserializer (SERDES) and the optical engine is bidirectional.

20. The helmet mounted display system of claim 19, wherein the multiplexer is further configured to:
multiplex and/or demultiplex the converted electrical data from the one or more media converters using the serializer/deserializer (SERDES) into one or more higher speed serial data streams based on one or more requirements of the active optical cable.

* * * * *